United States Patent [19]

Wideman et al.

[11] Patent Number: 4,797,452

[45] Date of Patent: Jan. 10, 1989

[54] POLYMERIC HYDROGENATION CATALYST CONTAINING PENDANT RHODIUM CONTAINING GROUPS

[75] Inventors: Lawson G. Wideman, Tallmadge; Wen-Liang Hsu, Copley, both of Ohio

[73] Assignee: The Goodyear Tire & Rubber Company, Akron, Ohio

[21] Appl. No.: 16,605

[22] Filed: Feb. 19, 1987

[51] Int. Cl.$^4$ .......................... C08F 8/04; C08C 19/02
[52] U.S. Cl. ..................................... 525/338; 525/340
[58] Field of Search ........................................ 525/338

[56] References Cited

U.S. PATENT DOCUMENTS

| | | | |
|---|---|---|---|
| 3,993,855 | 11/1976 | Kang | 526/25 |
| 4,355,140 | 10/1982 | Manziek | 525/329.4 |
| 4,503,196 | 3/1985 | Rempel | 525/338 |
| 4,581,417 | 4/1986 | Buding | 525/338 |

OTHER PUBLICATIONS

R. H. Grubbs et al., "Catalytic Reduction of Olefins with a Polymer-Supported Rhodium (I) Catalyst", Journal of the American Chemical Society, vol. 93 No. 12, Jun. 16, 1971, pp. 3062–3063.

*Primary Examiner*—Christopher Henderson
*Attorney, Agent, or Firm*—Alvin T. Rockhill

[57] ABSTRACT

This invention discloses a process for selectively hydrogenating double bonds in unsaturated polymers, such as polybutadiene. The utilization of the process of this invention results in a rate of vinyl hydrogenation which is slowed relative to the rate of backbone hydrogenation. By utilizing the process of this invention, the rate of hydrogenation of double bonds in the polymers is satisfactory. The process of the subject invention more specifically comprises contacting a polymer containing double bonds in its backbone and vinyl unsaturation with hydrogen in the presence of a polymer containing pendant groups having the structural formula $-Rh(P\phi_3)_2X$ wherein $\phi$ represents a phenyl group and wherein X represents a halogen atom. Polymers having pendant $-P\phi_2-Rh(P\phi_3)_2X$ groups are highly preferred catalysts for utilization in the selective hydrogenations of this invention.

15 Claims, No Drawings

POLYMERIC HYDROGENATION CATALYST CONTAINING PENDANT RHODIUM CONTAINING GROUPS

BACKGROUND OF THE INVENTION

The physical and chemical characteristics of natural and synthetic rubbers can be changed by hydrogenation. For instance, the tensile strength and resistance of a rubber to various solvents can often be improved by hydrogenating the rubber.

Numerous rubbers contain double bonds in their backbones as well as pendant vinyl groups. For example, in the synthesis of polybutadiene generally both 1,2-addition and 1,4-addition occurs with the polybutadiene consequently containing both 1,2- and 1,4-microstructures. The 1,4-addition causes the polybutadiene to have double bonds in its backbone and the 1,2-addition causes the polybutadiene to have pendant vinyl groups. The hydrogenation of such diene rubbers containing double bonds in their backbone as well as vinyl unsaturation with conventional hydrogenation catalysts normally result in a fast rate of vinyl hydrogenation relative to hydrogenation of the double bonds in the polymer's backbone. However, it would be highly desirable to selectively hydrogenate the double bonds in the backbone of elastomers. For example, the resistance of such polymers to ozonolysis is improved by selectively hydrogenating double bonds in the polymer's backbone with pendant vinyl groups, which can be utilized in curing or functionalizing the elastomer, being retained. Ozone attack on such vinyl groups will not cleave the polymer's backbone and will not appreciably lower the polymer's molecular weight or change its chemical or physical properties.

SUMMARY OF THE INVENTION

It was unexpectedly found that certain Wilkinson-type catalysts could be bound to polymers and utilized to selectively hydrogenate double bonds in the backbones of diene rubbers. More specifically, the catalysts used in the process of this invention are polymers containing pendant groups having the structural formula —Rh(P$\phi_3$)$_2$X wherein $\phi$ represents a phenyl group and wherein X represents a halogen atom. This invention accordingly reveals a process for improving the selectively of hydrogenating double bonds in the backbone of a polymer containing double bonds in its backbone and vinyl unsaturation, said process comprising contacting said polymer with hydrogen in the presence of a polymer containing pendant groups having the structural formula —Rh(P$\phi_3$)$_2$X wherein $\phi$ represents a phenyl group and wherein X represents a halogen atom.

DETAILED DESCRIPTION OF THE INVENTION

The process of this invention slows the relative rate of vinyl hydrogenation in polymers which contain double bonds in their backbones as well as vinyl groups. It is particularly useful for hydrogenating rubbers or elastomers. For example, the process of this invention improves the selectivity of hydrogenation of double bonds in the backbone of diene rubbers. Such diene rubbers are comprised of repeat units which are derived from at least one diene monomer and can optionally contain repeat units which are derived from other copolymerizable monomers, such as vinyl aromatic monomers. Such polymers will, of course, contain 1,2-microstructure (pendant vinyl groups) and 1,4-microstructure (double bonds in the polymer's backbone). High vinyl polybutadiene is a representative example of a rubber that can be selectively hydrogenated utilizing the process of this invention.

The catalysts used in the process of this invention are polymers containing pendant groups having the structural formula —Rh(P$\phi_3$)$_2$X wherein $\phi$ represents a phenyl group and wherein X represents a halogen. In many cases the pendant —Rh(P$\phi_3$)$_2$X groups will be bonded to the polymeric catalyst through various types of molecular linkages. Such pendant groups can be represented by the structural formula —L—Rh(P$\phi_3$)$_2$X wherein L represents a molecular linkage, wherein $\phi$ represents a phenyl group, and wherein X represents a halogen atom. For example, L can represent a straight or branched chain alkylene group, an arylene group, or an organometallic linkage. Some representative examples of such molecular linkages include diphenylphosphenyl groups and bipyridenyl groups. Polymeric catalysts having pendant —P$\phi_2$—Rh(P$\phi_3$)$_2$X groups are particularly preferred for utilization in the practice of this invention. In most cases the halogen atom present in the —Rh(P$\phi_3$)$_2$X group will be selected from the group consisting of chlorine atoms, bromine atoms, and iodine atoms. It is generally preferred for chlorine to be the halogen. Accordingly, pendant groups having the structural formula —Rh(P$\phi_3$)$_2$Cl wherein $\phi$ represents a phenyl group are highly preferred.

Virtually any type of polymer having pendant —Rh(P$\phi_3$)$_2$X groups can be used as the catalyst in the practice of this invention. Polystyrene which has been crosslinked with divinylbenzene has been determined to be a good choice as the polymer to which the pendant —Rh(P$\phi_3$)$_2$X groups can be bound. Such a polymeric catalyst has the structural formula:

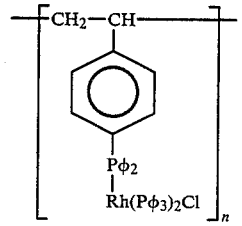

wherein $\phi$ represents a phenyl group and wherein n represents an integer. The polymeric catalyst can be utilized in a fixed bed for hydrogenation on a continuous basis or distributed throughout a mixture of the polymer being hydrogenated in the case of a batch process. The hydrogenation process of this invention must, of course, be conducted in the presence of hydrogen gas.

This hydrogenation reaction can be done in a batch process by distributing the hydrogen gas and polymeric catalyst throughout a solution of the polymer being hydrogenated. For example, hydrogen gas can be sparged through a solution of the polymer containing the polymeric catalyst while agitating the solution to keep the catalyst homogeneously dispersed throughout the solution. This hydrogenation reaction can also be carried out on a continuous basis by introducing hydrogen gas into a reaction zone containing a fixed bed catalyst while passing a solution of the polymer being selectively hydrogenated throughout the fixed bed catalyst.

The selective hydrogenation process of this invention can be carried out at atmospheric pressure ($1.0 \times 10^5$ Pascals) up to about 1,000 gauge pounds per square inch ($7.0 \times 10^6$ Pascals). It is preferred for the hydrogenation reaction to be run at about 50 gauge pounds per square inch ($4.5 \times 10^5$ Pascals) up to about 200 gauge pounds per square inch ($1.4 \times 10^6$ Pascals) The selective hydrogenation process of this invention can be carried out over a very wide temperature range. However, in most cases the selective hydrogenation will be carried out at a temperature within the range of about 20° C. to about 200° C. It will normally be preferred to utilize a temperature for the hydrogenation process which is within the range of about 30° C. to about 150° C. The hydrogenation process will, of course, be continued until the desired amount of hydrogen has been absorbed.

The following examples demonstrate the effectiveness of polymeric catalysts containing —Rh(P$\phi_3$)$_2$X groups at selectively hydrogenating double bonds in the backbones of polymers. These examples are merely for the purpose of illustration and are not to be regarded as limiting the scope of the invention or the manner in which it can be practiced. Unless specifically indicated otherwise all parts and percentages are given by weight.

EXAMPLE 1

In this experiment, a polymeric catalyst having pendant —P$\phi_2$—Rh(P$\phi_3$)$_2$Cl groups was prepared. In the first step of the catalyst preparation macroreticular styrene/divinylbenzene resin beads were brominated. This bromination process can be illustrated by the reaction:

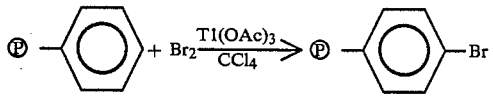

A 2-liter 3-necked flask equipped with an additional funnel, thermometer and mechanical stirrer was charged with 3.0 g of thallic acetate (Tl(OAc)$_3$), 100 g of styrene/divinylbenzene resin (Dow XFS 4022), and 1000 ml of carbon tetrachloride. The additional funnel was charged with 45 g of bromine dissolved in 100 ml of carbon tetrachloride. The entire apparatus was wrapped in glass wool to eliminate light. The bromine solution was added at room temperature and stirred for 30 minutes. The mixture was refluxed for 1½ hours or until the bromine color disappeared. The resin was filtered and soaked in acetone overnight. The soaked resin was filtered and washed with acetone, acetone/water, and acetone. The washed resin was then extracted with dichloromethane and dried in a vacuum oven at 60° C. Normal bromine contents are 17% by weight or less.

The brominated polystyrene beads were then phosphinated. The phosphination of the brominated styrene/divinylbenzene beads can be represented by the reaction:

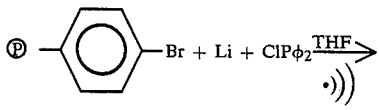

A 2-liter flask equipped with septum, thermometer, nitrogen purge and mechanical stirrer was charged with 100 g of brominated resin (16.8% Br), 6 g of lithium metal (cut into small pieces), 70 ml of chlorodiphenylphosphine and 600 ml of tetrahydrofuran (freshly distilled from sodium benzophenone ketyl) under nitrogen. The flask was placed in an ultrasonic bath and sonicated with stirring for 18 hours. Fifty ml of methanol was added to quench unreacted lithium and sonication was discontinued. The resin was collected by filtration and was washed consecutively with tetrahydrofuran (THF) and acetone. The resin was then extracted for 18 hours with acetone in a Soxhlet extractor and finally dried in a vacuum oven at 60° C. overnight. The phosphorus content of the resulting resin was about 3%. The triphenylphosphinated Dow resin (100 g), and Rh(P$\phi_3$)$_3$Cl (10 g) were charged to a three-necked flask containing 500 ml of chloroform. The mixture was then stirred mechanically under nitrogen at refluxing temperature of chloroform for 24 hours. The resin beads changed to dark brown at this time. After cooling to room temperature, the resins were filtered and washed with dichloromethane. After extracting in a Soxhlet extraction apparatus with a THF/methanol solution, the resins were dried under vacuum at 60° C. overnight. The resin beads contained 1.6% of Rh and can be represented by the structural formula Ⓟ—P$\phi$-2—Rh(P$\phi_3$)$_2$Cl wherein Ⓟ represents the styrene/divinylbenzene resin.

EXAMPLE 2

A 1-liter stainless steel autoclave was charged with 220 grams of high vinyl polybutadiene cement (20 g of rubber in 200 g of toluene) having a vinyl content of 88% and 5 grams of polystyrene beads having pendant —P$\phi_2$—Rh(P$\phi_3$)$_2$Cl groups. The polymeric catalyst used in this experiment contained 1.6 weight percent rhodium and was prepared using the technique described in Example 1. The autoclave was then charged at room temperature with hydrogen to a pressure of 150 gauge pounds per square inch ($1.4 \times 10^6$ Pascals). The autoclave was then heated to a temperature of about 110° C. and the hydrogen pressure was increased to 250 gauge pounds per square inch ($2.3 \times 10^6$ Pascals). The mixture in the reactor was maintained at a temperature of 110° C. and agitated for a period of 2 hours and 50 minutes, after which time 100 gauge pounds per square inch ($9.0 \times 10^5$ Pascals) of hydrogen was consumed. The reactor was then cooled and the rubber cement was decanted from the polymeric catalyst. The rubber which was recovered was then analyzed using NMR (nuclear magnetic resonance) spectrometry which revealed a 93% olefinic reduction. The residual vinyl to chain olefinic ratio was 3:1.

EXAMPLE 3

A 1-liter stainless steel autoclave was charged with 220 grams of high vinyl polybutadiene cement (20 g of polybutadiene rubber in 200 g of toluene) having a ratio of vinyl groups to double bonds in its backbone of about 3:1 and about 5 grams of polystyrene beads having pendant —Pφ₂—Rh(Pφ₃)₂Cl groups. The polymeric catalysts contained about 1.6 weight percent rhodium and were prepared utilizing the technique described in Example 1. The mixture in the autoclave was heated to a temperature of about 110° C. and the reactor was charged with 250 gauge pounds per square inch ($2.3 \times 10^6$ Pascals) of hydrogen. The mixture in the autoclave was maintained at a temperature of 50° C. with agitation for a period of 2 hours after which time 85 gauge pounds per square inch ($7.2 \times 10^5$ Pascals) of hydrogen was consumed. The reactor was then cooled and the rubber cement was decanted from the catalyst. NMR analysis revealed an 80% reduction in carbon to carbon double bonds with the residual vinyl to backbone olefinic ratio being about 3:1. This example clearly shows that carbon to carbon double bonds in the backbone of the polymer were selectively hydrogenated in preference to vinyl unsaturation.

EXAMPLE 4 (COMPARATIVE)

The procedure specified in Example 2 was repeated in this experiment except that 0.2 grams of Wilkinson catalyst, rhodium tris(triphenylphosphine)chloride, was used in place of the polymeric catalyst utilized in Example 3. After 85 gauge pounds per square inch ($7.2 \times 10^5$ Pascals) of hydrogen was consumed, the reactor was cooled and the rubber cement was decanted from the catalyst. NMR analysis of the hydrogenated rubber revealed an 81% reduction in carbon to carbon double bonds. The residual vinyl to backbone olefinic ratio was 1:2. The ratio of vinyl groups to double bonds in the backbone of the polymer hydrogenated in Example 3 was 3:1. Thus, the polymeric catalyst utilized in Example 3 clearly hydrogenated vinyl groups at a slower rate. The process disclosed in Example 3 clearly improved the selectivity of hydrogenation of double bonds in the backbone of the rubber. The Wilkinson catalyst utilized in this comparative example hydrogenated vinyl groups at a faster rate than it hydrogenated double bonds in the backbone of the polymer.

EXAMPLE 5

In this experiment a polymeric catalyst having pendant

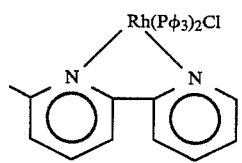

groups was prepared. In the first step of the catalyst preparation styrene/divinylbenzene beads were brominated as described in Example 1.

A 1-liter 3-necked flask equipped with a thermometer, mechanical stirrer and septum was then nitrogen purged and charged with 50 g of the brominated resin beads and 500 ml of dry THF (freshly distilled from sodium benzophenone ketyl). Dry nitrogen was bubbled through the reaction mixture for one hour. The mixture was cooled to 0° C. and 65 ml of 22% n-butyl lithium in hexane was added by syringe and the mixture was stirred at 0° C. for 45 minutes. The reaction was warmed to room temperature and stirred for 30 minutes. Twenty-three g of 2,2'-bipyridine was added and the mixture refluxed for three hours. The reaction was quenched by air. The resin was filtered and washed with THF, toluene, and ethyl acetate. The washed resin beads were extracted with THF/methanol and dried in a vacuum oven at 60° C. The nitrogen content was approximately 1-2%. The reaction that took place can be illustrated as follows:

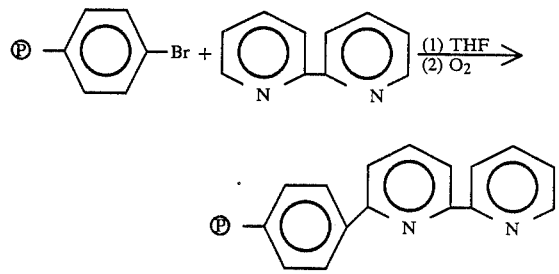

The bound bipyridyl resin beads (50 g) and Rh(Pφ₃)₃Cl (5 g) were charged to a three-necked flask containing 500 ml of chloroform. The mixture was stirred mechanically under nitrogen at refluxing temperature of chloroform for 24 hours. After cooling to room temperature, the black resin beads were filtered and washed with dichloromethane. After extracting in a Soxhlet extraction apparatus with a THF/methanol solution, the resins were dried under vacuum at 68° C. overnight. The polymeric catalyst produced contained about 1.5 weight percent rhodium.

EXAMPLE 6

The procedure specified in Example 2 was repeated in this experiment except that 10 g of high vinyl polybutadiene in 200 g of toluene was charged into the reactor and except that the polymeric catalyst synthesized in Example 5 was used in place of the catalyst used in Example 2. After a hydrogenation time of 2.5 hours, 35 gauge pounds per square inch ($3.2 \times 10^5$ Pascals) of hydrogen had been consumed. An analysis of the hydrogenated rubber showed a 52% olefinic reduction with the ratio of vinyl groups to double bonds in the backbone being 1:1.

While certain representative embodiments and details have been shown for the purpose of illustrating this invention, it will be apparent to those skilled in this art that various changes and modifications can be made therein without departing from the scope of this invention.

What is claimed is:

1. A process for improving the selectivity of hydrogenating double bonds in the backbone of a polymer containing double bonds in its backbone and vinyl unsaturation, said process comprising contacting said polymer containing double bonds in its backbone and vinyl unsaturation with hydrogen in the presence of a polymer containing pendant groups having the structural formula —Rh(Pφ₃)₂X wherein φ represents a phenyl group; wherein X represents a halogen atom; wherein said process is carried out at a pressure within the range of $1.0 \times 10^5$ Pascals to about $7.0 \times 10^6$ Pascals; and wherein said process is carried out at a temperature which is within the range of about 20° C. to about 200° C.

2. A process as specified in claim 1 wherein said halogen is selected from the group consisting of chlorine, bromine, and iodine.

3. A process for improving the selectively of hydrogenating double bonds in the backbone of an elastomer, said process comprising contacting said elastomer with hydrogen in the presence of a polymer containing pendant groups having the structural formula —L—Rh(P$\phi_3$)$_2$X, wherein L represents a molecular linkage, wherein $\phi$ represents a phenyl group and wherein X represents a halogen atom.

4. A process as specified in claim 3 wherein said polymer contains pendant groups having the structural formula —P$\phi_2$—Rh(P$\phi_3$)$_2$X wherein $\phi$ represents a phenyl group and wherein X represents a halogen atom.

5. A process as specified in claim 4 wherein said halogen is selected from the group consisting of chlorine, bromine and iodine.

6. A process as specified in claim 4 wherein said halogen is chlorine.

7. A process as specified in claim 6 wherein said elastomer is polybutadiene.

8. A process as specified in claim 7 wherein said polybutadiene is high vinyl polybutadiene.

9. A process as specified in claim 6 wherein said polymer is polystyrene having pendant —P$\phi_2$—Rh(P$\phi_3$)$_2$Cl groups.

10. A process as specified in claim 6 wherein said polymer is a styrene/divinylbenzene resin having pendant —P$\phi_2$—Rh(P$\phi_3$)$_2$Cl groups.

11. A process as specified in claim 6 wherein the hydrogen is at a pressure within the range of $4.5 \times 10^5$ Pascals to $1.4 \times 10^6$ Pascals.

12. A process as specified in claim 11 wherein said process is carried out at a temperature within the range of about 30° C. to about 150° C.

13. A process as specified in claim 12 wherein said elastomer is polybutadiene.

14. A process as specified in claim 5 wherein said elastomer is a diene rubber.

15. A process as specified in claim 13 wherein said polymer is a styrene/divinylbenzene resin having pendant —P$\phi_2$—Rh(P$\phi_3$)$_2$Cl groups.

* * * * *